(12) United States Patent
Park et al.

(10) Patent No.: US 11,461,113 B2
(45) Date of Patent: Oct. 4, 2022

(54) TRAINING METHOD OF MEMORY DEVICE AND ELECTRONIC DEVICE AND ELECTRONIC SYSTEM INCLUDING THE SAME

(71) Applicant: SAMSUNG ELECTRONICS CO., LTD., Suwon-si (KR)

(72) Inventors: Jang Seon Park, Gwangju-si (KR); Jong Un Kim, Seoul (KR); Ju Chan Lee, Seoul (KR); Hyung Lae Eun, Seongnam-si (KR); Dong Kim, Hwaseong-si (KR); In Hoon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 299 days.

(21) Appl. No.: 16/906,023

(22) Filed: Jun. 19, 2020

(65) Prior Publication Data

US 2021/0064390 A1 Mar. 4, 2021

(30) Foreign Application Priority Data

Aug. 30, 2019 (KR) .................. 10-2019-0107008

(51) Int. Cl.
*G06F 9/445* (2018.01)
*G06F 12/02* (2006.01)
(Continued)

(52) U.S. Cl.
CPC .......... *G06F 9/44505* (2013.01); *G06F 1/206* (2013.01); *G06F 12/0238* (2013.01);
(Continued)

(58) Field of Classification Search
CPC .... G06F 1/206; G06F 1/3296; G06F 12/0238; G06F 2212/1016; G06F 2212/1032;
(Continued)

(56) References Cited

U.S. PATENT DOCUMENTS 10,262,708 B2 4/2019 Jeong et al.
10,268,409 B2 4/2019 Lee et al.
(Continued)

FOREIGN PATENT DOCUMENTS

KR 10-0910852 B1 8/2009
KR 10-1603718 B1 3/2016
(Continued)

*Primary Examiner* — Terrell S Johnson
(74) *Attorney, Agent, or Firm* — Sughrue Mion, PLLC

(57) ABSTRACT

An electronic device includes: a memory device; a nonvolatile memory configured to store a plurality of first configuration parameters respectively corresponding to operating voltages of the memory device and a plurality of second configuration parameters respectively corresponding to operating temperatures of the memory device; and a memory controller configured to: determine a value of a third configuration parameter corresponding to an operating voltage of the memory device among the plurality of first configuration parameters stored in the nonvolatile memory without performing a training operation, determine a value of a fourth configuration parameter corresponding to an operating temperature of the memory device among the plurality of second configuration parameters stored in the nonvolatile memory without performing the training operation, and drive the memory device according to the determined values of the third and the fourth configuration parameters.

20 Claims, 15 Drawing Sheets

(51) Int. Cl.
  *G06N 5/02* (2006.01)
  *G06F 1/20* (2006.01)
  *G06N 20/00* (2019.01)
  *G06F 1/3296* (2019.01)

(52) U.S. Cl.
  CPC .............. *G06N 5/02* (2013.01); *G06N 20/00* (2019.01); *G06F 1/3296* (2013.01); *G06F 2212/1016* (2013.01); *G06F 2212/1032* (2013.01); *G06F 2212/202* (2013.01); *G06F 2212/7206* (2013.01); *Y02D 10/00* (2018.01)

(58) Field of Classification Search
  CPC ....... G06F 2212/202; G06F 2212/7206; G06F 9/44505; G06N 20/00; G06N 5/02; Y02D 10/00
  See application file for complete search history.

(56) References Cited

U.S. PATENT DOCUMENTS

| | | |
|---|---|---|
| 10,325,633 B2 | 6/2019 | Lee et al. |
| 10,943,183 B2 * | 3/2021 | Cha ..................... G11C 29/028 |
| 2008/0320267 A1 * | 12/2008 | Bilger ...................... G11C 8/18 |
| | | 711/170 |
| 2012/0284576 A1 | 11/2012 | Housty et al. |
| 2017/0031816 A1 * | 2/2017 | Lee .......................... G06F 3/061 |
| 2019/0172516 A1 | 6/2019 | Kim |

FOREIGN PATENT DOCUMENTS

| KR | 10-2018-0007374 A | 1/2018 |
|---|---|---|
| KR | 10-2019-0066500 A | 6/2019 |

\* cited by examiner

Fig. 11

| CPn | V_a ··· V_m ··· V_x |
|---|---|
| T_a | |
| ⋮ | ⋮ |
| T_n | ··· CPn_m(n,m) |
| ⋮ | |
| T_x | |

| CPm | V_a ··· V_m ··· V_x |
|---|---|
| T_a | |
| ⋮ | ⋮ |
| T_n | ··· CPm_m(n,m) |
| ⋮ | |
| T_x | |

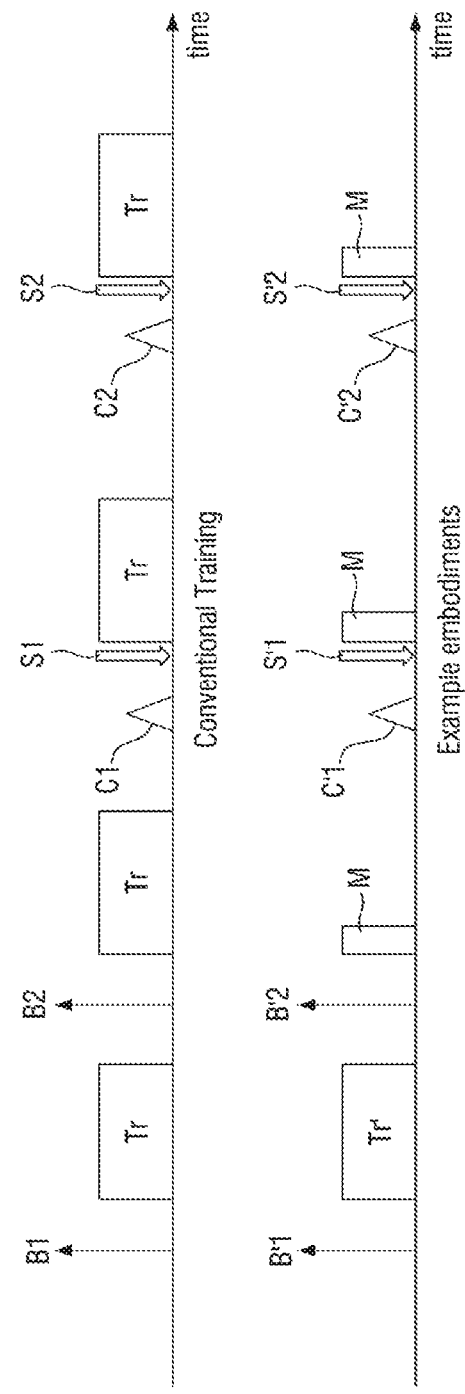

TRAINING METHOD OF MEMORY DEVICE AND ELECTRONIC DEVICE AND ELECTRONIC SYSTEM INCLUDING THE SAME

CROSS-REFERENCE TO THE RELATED APPLICATION

This application claims priority from Korean Patent Application No. 10-2019-0107008 filed on Aug. 30, 2019 in the Korean Intellectual Property Office, and all the benefits accruing therefrom under 35 U.S.C. 119, the contents of which in its entirety are herein incorporated by reference.

BACKGROUND

1. Technical Field

Example embodiments of the disclosure relate to a training method of a memory device, an electronic device, and an electronic system including the same.

2. Description of the Related Art

In order to train a memory and/or a memory controller, a more detailed training algorithm is required as an operation speed increases, and has a longer open time as a rank increases. Therefore, it is not suitable to perform full training in a memory system requiring a short open time. Training is performed periodically while an electronic device is driven. In order to perform the memory/memory controller training, the memory system must stop a currently running operation, which affects the performance of the system.

In addition, in an environment in which an operating voltage and an operating temperature of a memory device change frequently, the operating voltage and temperature of the memory device become factors that influence the training. The training is carried out by reflecting this environment and research is being conducted on the training that may immediately reflect the environment where the operating voltage and temperature change frequently.

SUMMARY

One or more example embodiments of the disclosure provide an electronic device capable of reducing training execution time, that is, time taken to perform training of a memory device included in the electronic device.

One or more example embodiments of the disclosure also provide a training method of a memory device capable of reducing training execution time.

One or more example embodiments of the disclosure also provide an electronic system capable of reducing training execution time.

However, aspects of the disclosure are not restricted to those set forth herein. The above and other aspects of the disclosure will become more apparent to one of ordinary skill in the art to which the disclosure pertains by referencing the detailed description of the disclosure given below.

According to an aspect of an example embodiment of the inventive concept, there is provided an electronic device including: a memory device; a nonvolatile memory configured to store a plurality of first configuration parameters respectively corresponding to operating voltages of the memory device and a plurality of second configuration parameters respectively corresponding to operating temperatures of the memory device; and a memory controller configured to: determine a value of a third configuration parameter corresponding to an operating voltage of the memory device among the plurality of first configuration parameters stored in the nonvolatile memory without performing a training operation, determine a value of a fourth configuration parameter corresponding to an operating temperature of the memory device among the plurality of second configuration parameters stored in the nonvolatile memory without performing the training operation, and drive the memory device according to the determined values of the third and the fourth configuration parameters.

According to an aspect of an example embodiment of the inventive concept, there is provided a training method of a memory device, the method including: storing, in a storage unit, a plurality of first configuration parameters corresponding to operating voltages and operating temperatures of the memory device; after storing the plurality of first configuration parameters, performing a boot-up of the memory device; measuring an operating voltage and an operating temperature of the memory device that is booted up; loading a second configuration parameter corresponding to the operating voltage and the operating temperature, among the plurality of first configuration parameters, into a memory controller; and mapping the loaded second configuration parameter to the memory device without performing a training operation.

According to an aspect of an example embodiment of the inventive concept, there is provided an electronic system including: a first electronic device including a first memory device included in a memory device, a first nonvolatile memory configured to store a plurality of first configuration parameters corresponding to operating voltages and operating temperatures of the first memory device, and a first memory controller configured to control the first memory device; and a second electronic device including a second memory device included in the memory device, a second nonvolatile memory configured to store a plurality of second configuration parameters corresponding to voltages and temperatures of the second memory device, and a second memory controller configured to control the second memory device, the second electronic device being separate from the first electronic device, wherein the first memory controller is further configured to map a third configuration parameter, corresponding to an operating voltage and an operating temperature of the first memory device among the plurality of first configuration parameters, to the first memory device without performing a training operation, and wherein the second memory controller is further configured to map a fourth configuration parameter, corresponding to an operating voltage and an operating temperature of the second memory device among the plurality of second configuration parameters, to the second memory device without performing the training operation.

BRIEF DESCRIPTION OF THE DRAWINGS

The above and other aspects and features of the disclosure will become more apparent by describing in detail example embodiments thereof with reference to the attached drawings, in which:

FIGS. 10 and 11 are diagrams describing another example embodiment of the configuration parameter storing operation of FIG. 3;

FIG. 15 is a timing diagram describing an effect according to an example embodiment of FIG. 13.

DETAILED DESCRIPTION

Hereinafter, example embodiments of the inventive concept will be described with reference to the accompanying drawings.

Figure 1:
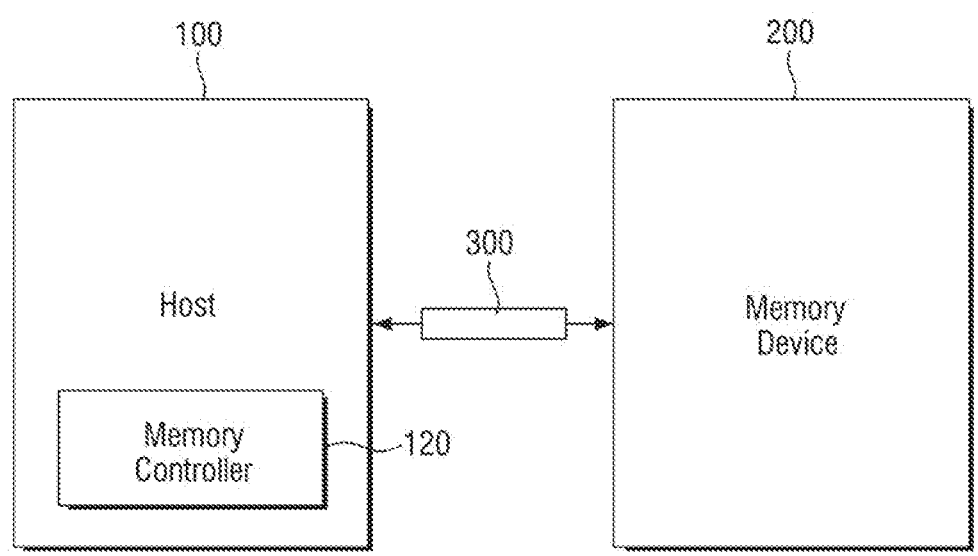
FIG. 1 is a block diagram schematically illustrating an electronic device according to some example embodiments.

FIG. 1 is a block diagram schematically illustrating an electronic device according to some example embodiments.

Referring to FIG. 1, an electronic device according to some example embodiments may include a host 100 and a memory device 200. A channel 300 for exchanging a signal and data may be provided between the host 100 and the memory device 200.

The host 100 may execute various applications in response to a user's request. The host 100 may load an application into the memory device 200 to execute the application. The host 100 may drive an operating system (OS) and execute various applications on the operating system (OS). For this operation, the host 100 may write data to the memory device 200 and/or read data stored in the memory device 200.

The host 100 may perform training on a configuration parameter (CP) of the memory device 200 in a booting or a specific situation. The term 'training' as used herein refers to an operation of searching for a signal level or latency of a memory channel for providing optimal reliability. Through training, the host 100 may increase the reliability of exchanging data or a signal with the memory device 200. For example, the host 100 may write or read training data (TD) to or from the memory device 200 under various conditions to determine an optimal clock timing or a reference level.

In particular, the host 100 according to some example embodiments of the disclosure may load a training code (TC) for performing training to the memory device 200. The training code (TC) substantially corresponds to an executable code for performing training. If an error occurs in the training code, a general training operation may fail. Therefore, it is needed to secure the stability of the training code (TC) to secure the reliability of data or a signal.

The memory device 200 may be driven as a main memory of the electronic device. An operating system (OS) or basic application programs may be loaded onto the memory device 200 when the electronic device is booted.

For example, when the host 100 is booted, an OS image stored in a nonvolatile memory (not shown) may be loaded onto the memory device 200 based on a boot sequence. Various input/output operations of the host 100 may be supported by the operating system.

Similarly, application programs may be loaded onto the memory device 200 in order to be selected by a user or to provide basic services. In addition, the memory device 200 may be used as a buffer memory that stores image data provided from an image sensor such as a camera.

The memory device 200 may be a dynamic random access memory (DRAM) capable of being byte-accessed. For example, a low power double data rate synchronous DRAM (LPDDR SDRAM), a double data rate (DDR) SDRAM, or a graphics DDR SDRAM (GDDR SDRAM) may be applied to the memory device 200. Examples of an LPDDR SDRAM may include an LPDDR3, an LPDDR4 and an LPDDR5, and examples of a DDR SDRAM may include a DDR4 and a DDR5, without being limited thereto.

Training for a configuration parameter (CP) of the LPDDR SDRAM may include write clock (WCK) to clock (CK)(WCK2CK) leveling training, WCK-DQ training, command bus training, write leveling, and write training, read training, and reference voltage training (or Vref training), but may not be limited thereto.

Training for a configuration parameter (CP) of the DDR SDRAM may include write leveling, write training, read training, and Vref training. In addition to these examples, any other training of a configuration parameter (CP) for the memory device 200 may be included.

The memory device 200 may be provided as a nonvolatile memory device that may be overwritten. For example, the memory device 200 may be configured as a nonvolatile RAM such as a phase change RAM (PRAM), a magnetic RAM (MRAM), a resistive RAM (ReRAM), a ferroelectric RAM (FRAM), a NOR flash, and a NAND flash. The memory device 200 stores an operating system (OS), a running application program, updated data, and the like when the electronic device is driven. The memory device 200 may be provided in a form of a module or a multichip package having multi-chips stacked. However, a configuration method of the memory device 200 is not limited to the examples disclosed herein.

The channel 300 may provide a transmission path of data or a signal on the host 100 and the memory device 200. Although the channel 300 is illustrated as a single channel in FIG. 1, a plurality of channels may be provided. When the channel 300 is provided in plural, the memory device 200 may be controlled according to a channel interleaving method, and the memory device 200 and the host 100 may exchange data through each of the plurality of channels independently.

Figure 2:
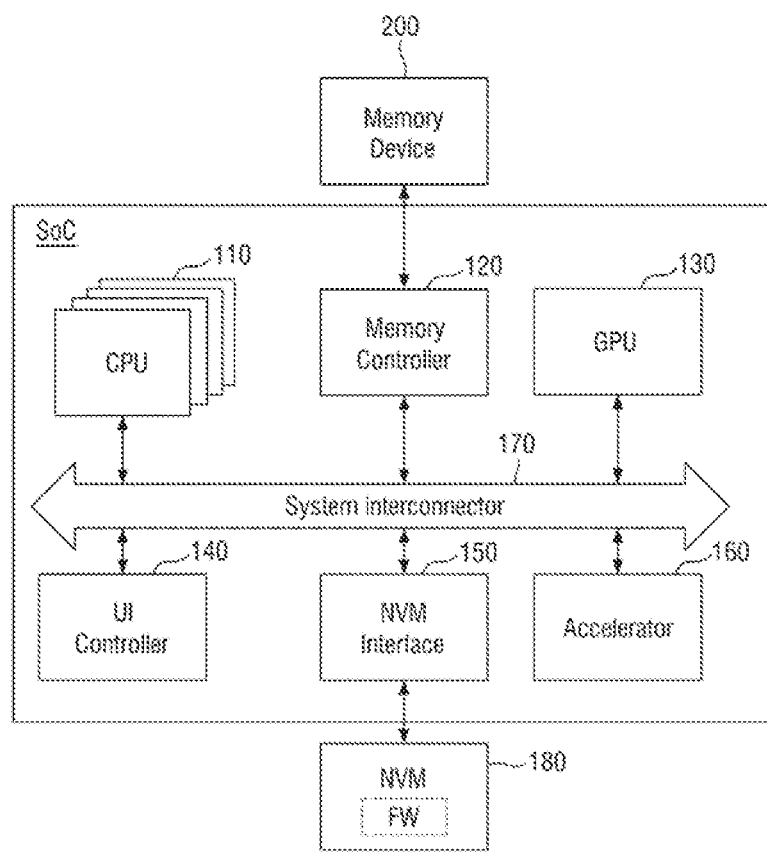
FIG. 2 is a block diagram illustrating a structure of a host of an electronic device according to some example embodiments.

FIG. 2 is a block diagram illustrating a structure of a host of an electronic device according to some example embodiments of the disclosure.

Referring to FIG. 2, the host 100 may be implemented in a system on chip (SoC), and the SoC may include a central processing unit (CPU) 110, a memory controller 120, a graphics processing unit (GPU) 130, a user interface controller 140, a nonvolatile memory interface 150, an accelerator 160, and the like.

It should be understood that components of the SoC are not limited to the elements shown in the drawing. For example, the SoC may further include a hardware codec, a security block, and the like for processing image data.

The CPU 110 executes software (e.g., an application program, an operating system, and device drivers) to be performed in the host 100. The CPU 110 may execute an operating system (OS) loaded onto the memory device 200. The CPU 110 may execute various application programs to be driven based on the operating system (OS). In particular, the CPU 110 may patch and execute a training code (TC) loaded onto the memory device 200.

The CPU 110 may control the memory controller 120 to perform a training operation of the memory device 200 according to the execution of the training code (TC). The CPU 110 may be provided as a homogeneous multi-core processor or a heterogeneous multi-core processor.

The memory controller 120 may be included in the memory device 200, or may be included in the host 100 to control the memory device 200. The host 100 may transmit a read request to the memory controller 120 to read data stored in the memory device 200. The memory controller 120 may access the memory device 200 to read data requested by the host. The host may be connected to the memory device 200 through at least one channel.

Accordingly, the memory controller 120 may provide interfacing between the memory device 200 and the SoC. The memory controller 120 may access the memory device 200 in response to a request of the CPU 110 or another function block (IP).

For example, the memory controller 120 may write data to the memory device 200 in response to a write request of the CPU 110. Alternatively, the memory controller 120 may read data from the memory device 200 and transfer the data to the CPU 110 or the nonvolatile memory interface 150. During the training operation, the memory controller 120 may release channel interleaving or adjust a unit of channel interleaving in response to a request of the CPU 110.

In addition, the memory controller 120 may access the memory device 200 in response to the request of various master function blocks (or Master IP) of the host. For example, in response to a request for access to the memory device 200, the memory controller 120 may transfer data DQ in synchronization with a strobe signal DQS. Alternatively, the memory controller 120 may receive data DQ output from the memory device 200 in synchronization with a strobe signal DQS.

The GPU 130 performs various graphic operations in response to the request of the CPU 110. For example, the GPU 130 may convert data requested for processing into data suitable for a display (not shown). The GPU 130 may have a computational structure that is advantageous for parallel processing in which similar operations are repeatedly processed.

The user interface controller 140 controls user input and output from user interface devices (e.g., a keyboard, a touch panel, or a display). For example, the user interface controller 140 may display a keyboard screen for receiving data on a display (not shown) under the control of the CPU 110. Alternatively, the user interface controller 140 may control the display to show data requested by the user. The user interface controller 140 may decode data provided from user input interface devices such as a keyboard, a mouse, and a touch panel into user input data.

The nonvolatile memory interface 150 accesses a nonvolatile memory 180 in response to the request of the CPU 110. That is, the nonvolatile memory interface 150 provides an interface between the SoC and the nonvolatile memory 180. For example, data processed by the CPU 110 is stored in the nonvolatile memory 180 through the nonvolatile memory interface 150. In addition, data stored in the nonvolatile memory 180 may be provided to the CPU 110 through the nonvolatile memory interface 150.

The accelerator 160 may be provided as a separate functional block for improving a processing speed of multimedia or multimedia data. For example, the accelerator 160 may be provided as a functional block (IP) for improving processing performance of text, audio, still images, animation, video, two-dimensional data, or three-dimensional data.

A system interconnector 170 is a system bus for providing an on-chip network inside the SoC. The system interconnector 170 may include, for example, a data bus, an address bus, and a control bus. The data bus provides a path through which data travels. The data bus may primarily provide a memory access path through which an access may be made to the memory device 200 or the nonvolatile memory 180. The address bus provides an address exchange path through which an address may be exchanged between functional blocks (IPs). The control bus provides a path through which a control signal is transferred between the functional blocks (IPs). However, a configuration of the system interconnector 170 is not limited to the above description, and may further include mediation means for efficient management.

The nonvolatile memory 180 is provided as a storage medium (or a storage unit) of the host. The nonvolatile memory 180 may store a firmware (FW), application programs, an OS image, and various data. In particular, a training code (TC) for training the memory device 200 may be stored in a specific region of the nonvolatile memory 180. However, the training code (TC) may be stored in a nonvolatile memory other than the nonvolatile memory 180. The nonvolatile memory 180 may be provided as a memory card (e.g., an MMC, an eMMC, a secure digital (SD), an MicroSD, or the like). For example, the nonvolatile memory 180 may include a NAND-type flash memory having a large storage capacity.

Alternatively, the nonvolatile memory 180 may include a NOR flash memory or a next generation nonvolatile memory such as a PRAM, an MRAM, an ReRAM, an FRAM and the like. In another example embodiment of the disclosure, the nonvolatile memory 180 may be an internal memory provided inside the SoC.

Figure 3:
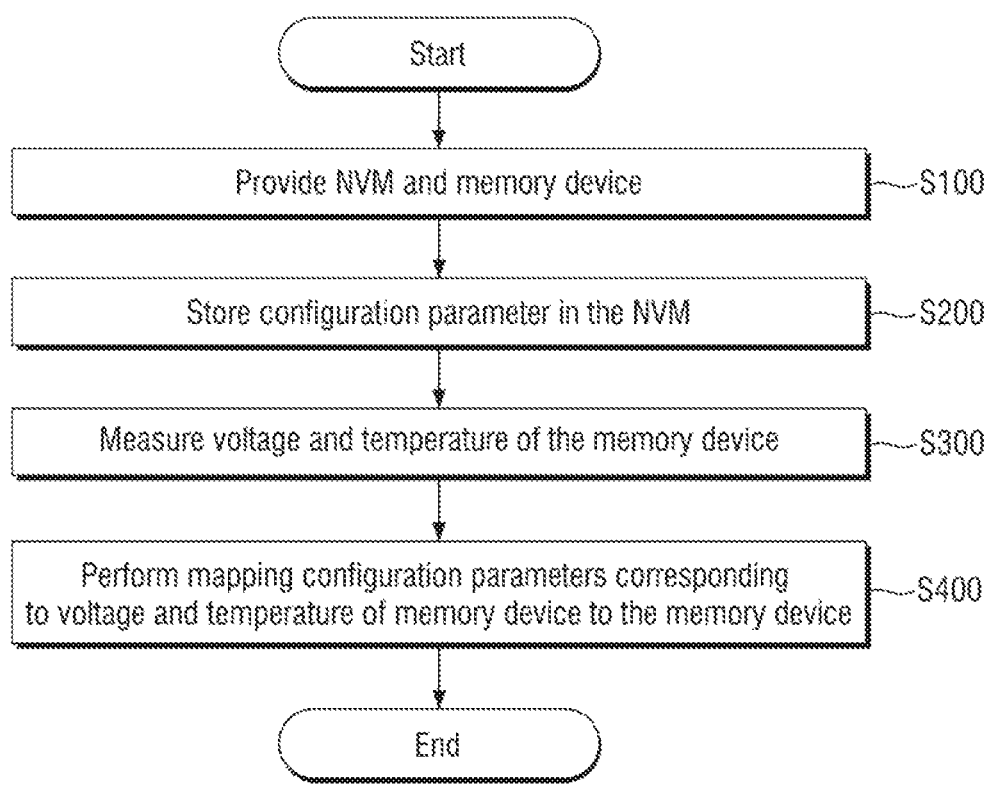
FIG. 3 is a flowchart illustrating a training method of a memory device according to some example embodiments.

FIG. 3 is a flowchart illustrating a training method of a memory device according to some example embodiments.

Referring to FIGS. 2 and 3, a training method of the memory device 200 according to some example embodiments may be described.

First, a nonvolatile memory and a memory device are provided (operation S100). Further referring to FIG. 5 which will be described below, for example, a total of M electronic devices from a first electronic device Device_1 to an $M^{th}$ electronic device Device_M may be provided. A method of providing the memory device may be performed in various forms including production and the like. From the first electronic device Device_1 to the $M^{th}$ electronic device Device_M, any one electronic device, i.e., $m^{th}$ electronic device Device_m ($1 \leq m \leq M$) may be provided.

A configuration parameter is stored in a nonvolatile memory of each of the electronic devices (operation S200). In operation S200 according to some example embodiments, a plurality of configuration parameters (CPs) may be stored, values of which are varied depending on a voltage and a temperature of a memory device through a firmware (FW) stored in the nonvolatile memory.

In operation S200, the method of storing the configuration parameter (CP) may vary according to an example embodiment. A detailed description of example embodiments for operation S200 will be described later.

An operating voltage and an operating temperature of the memory device 200 are measured (operation S300). In operation S300, when the memory device 200 operates after booting up, an operating voltage and an operating temperature required for operating the memory device 200 are measured.

A configuration parameter (CP) corresponding to the operating voltage and the operating temperature of the memory device 200 is mapped to the memory device 200 (operation S400). Further referring to FIG. 12, before performing the mapping, a product firmware (PFW) may load onto the memory controller 120 a configuration parameter (CP) corresponding to the operating voltage and the operating temperature among the plurality of configuration parameters (CPs).

The loaded configuration parameter (CP) may be mapped to the memory device 200 by the memory controller 120 without performing a separate training operation, which will be described below. The mapping operation of the memory device 200 may be performed after the memory device 200 is booted up as in the above-described measurement operation.

Figure 4:
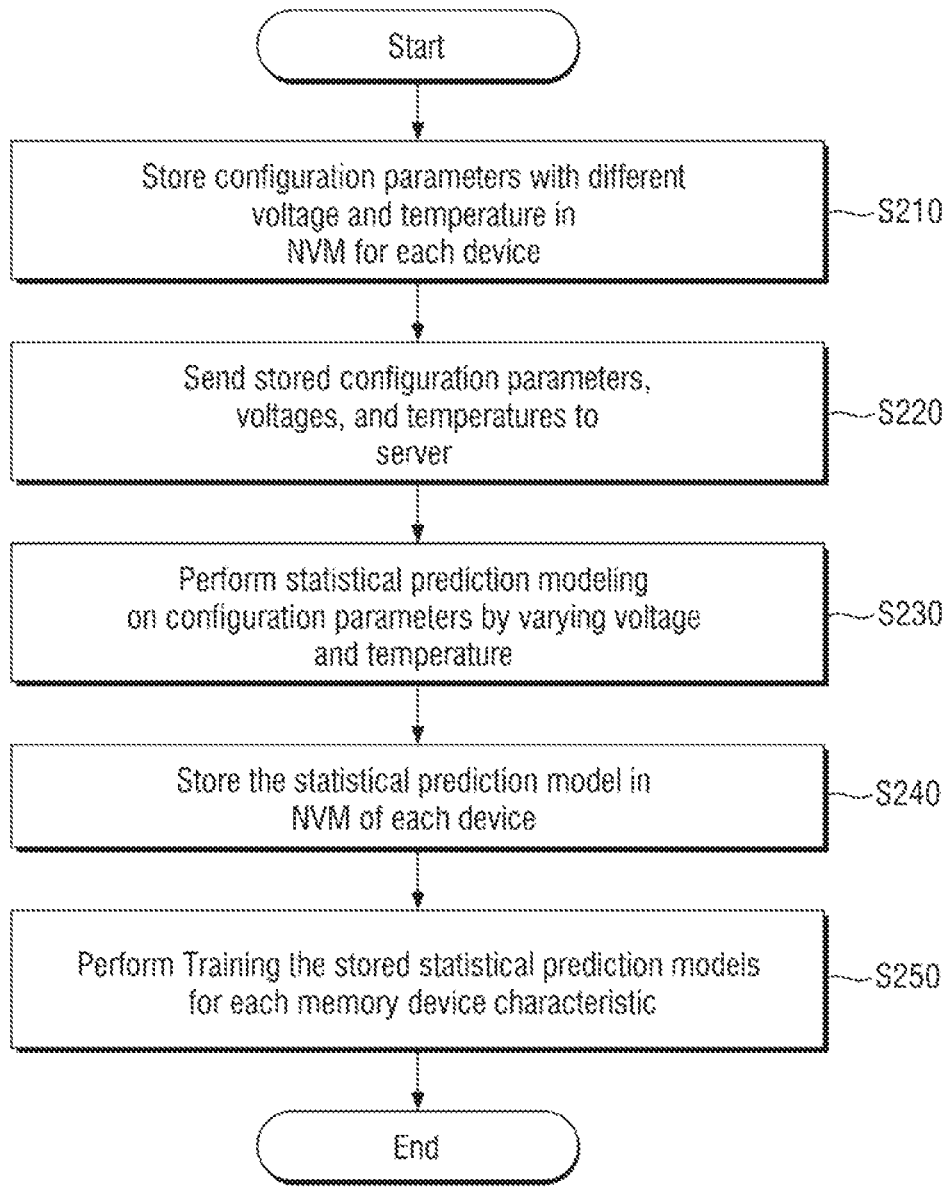
FIG. 4 is a flowchart explaining an example embodiment of a configuration parameter storing operation of FIG. 3.
Figure 5:
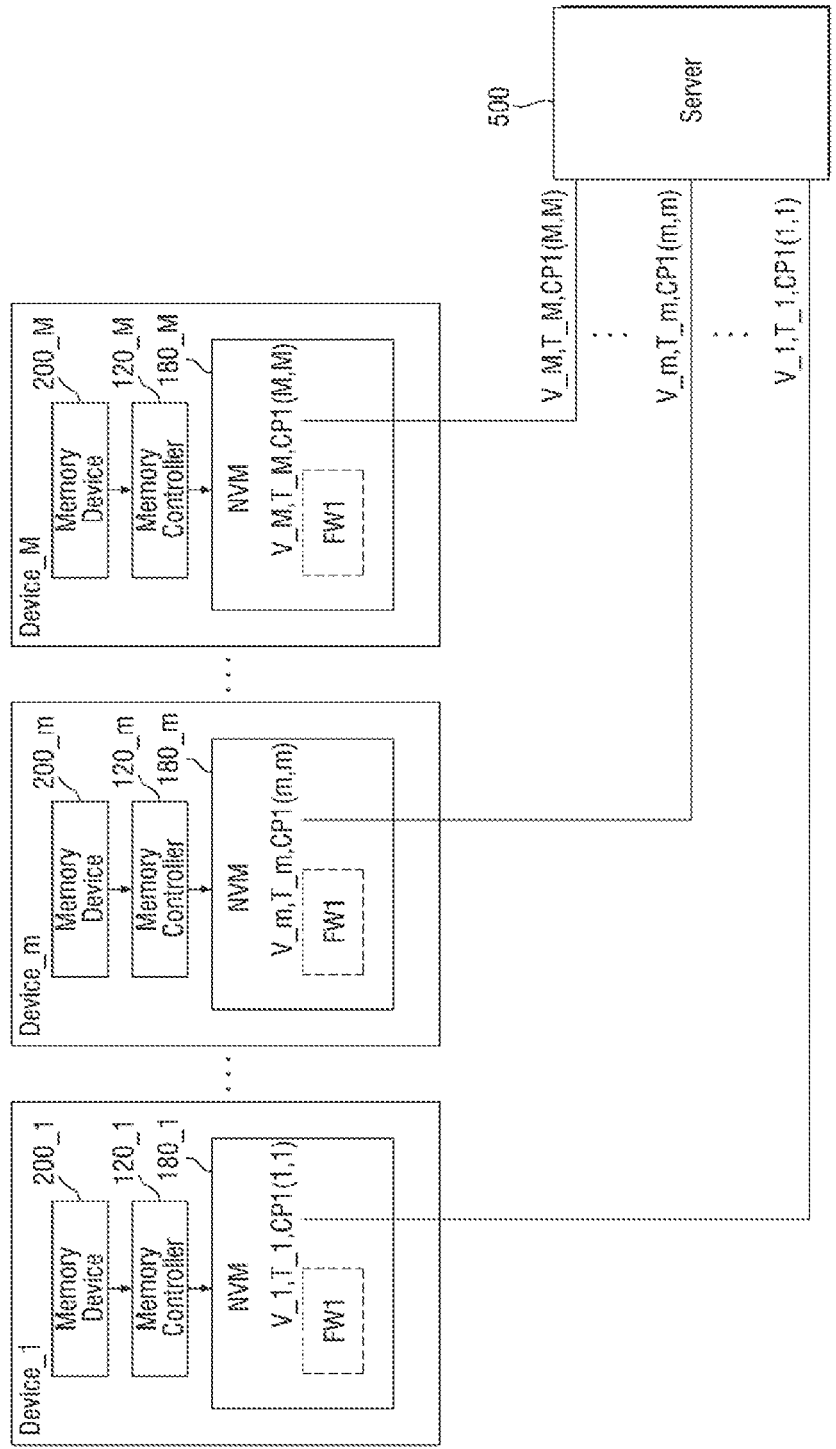
FIGS. 5 to 7 are diagrams explaining an example statistical prediction modeling according to the example embodiment of FIG. 4.
Figure 6:
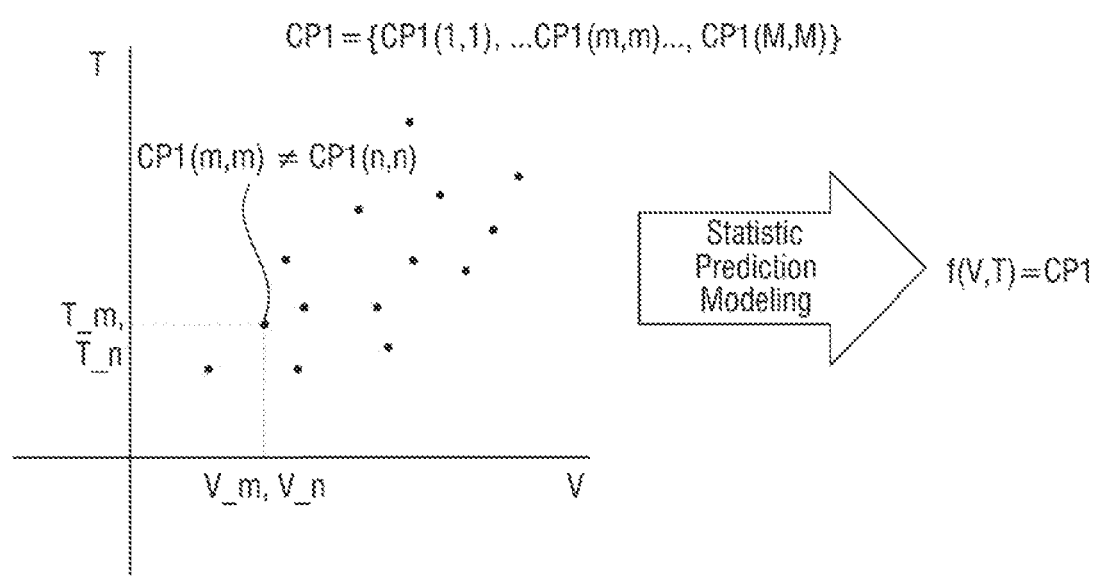
Figure 7:
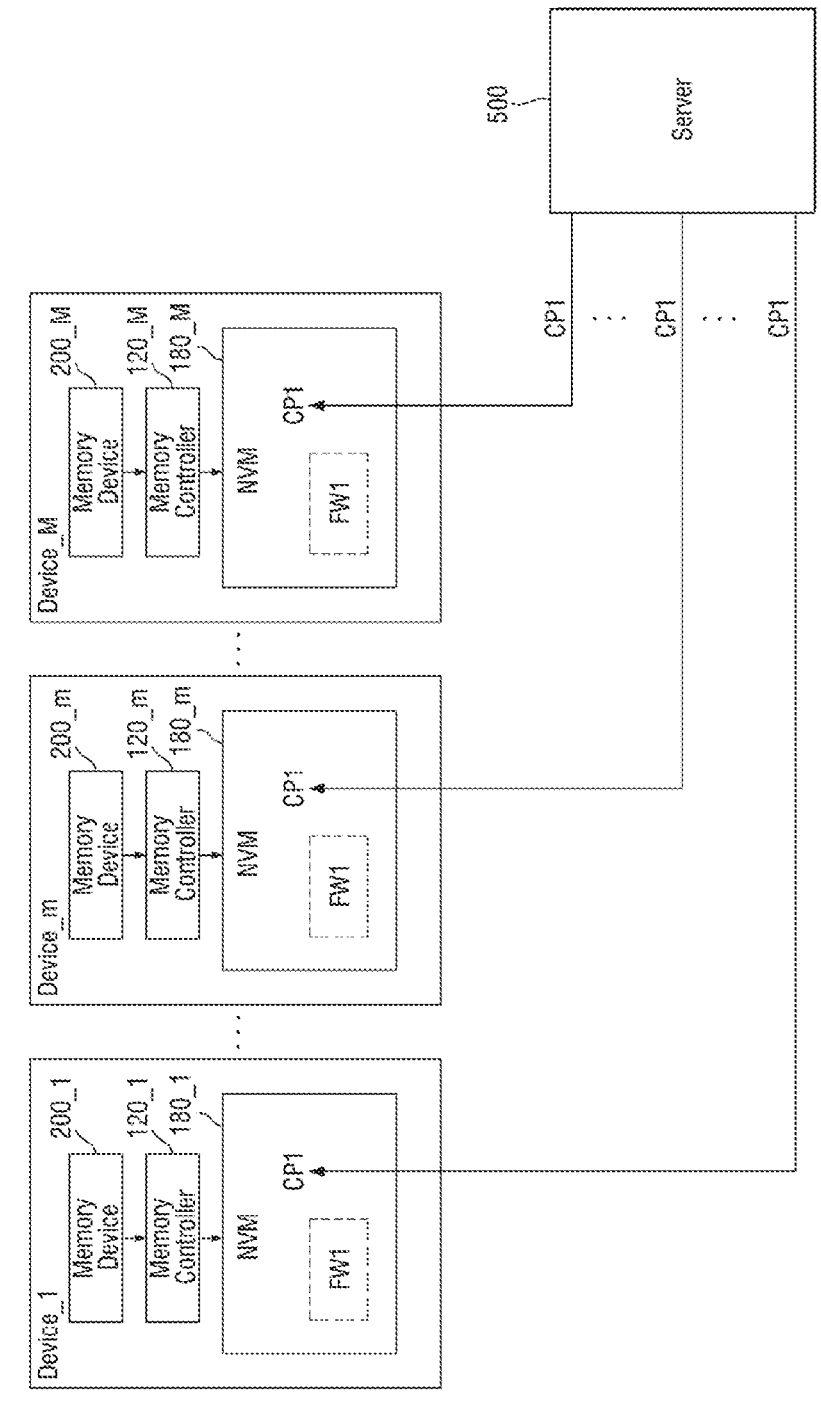
Figure 8:
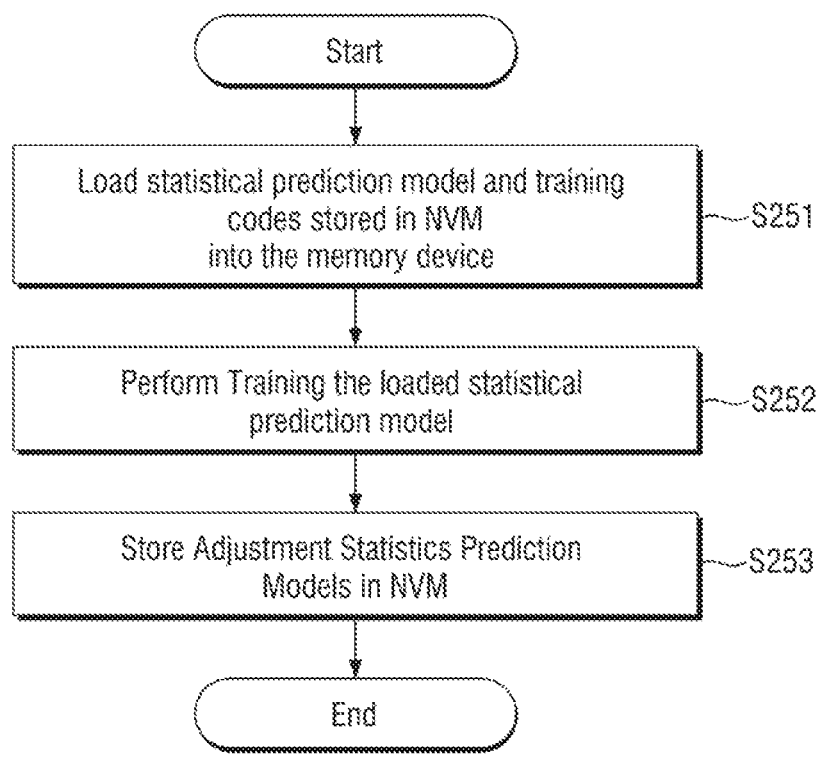
FIGS. 8 and 9 are diagrams describing an example embodiment of a training operation of FIG. 4.
Figure 9:
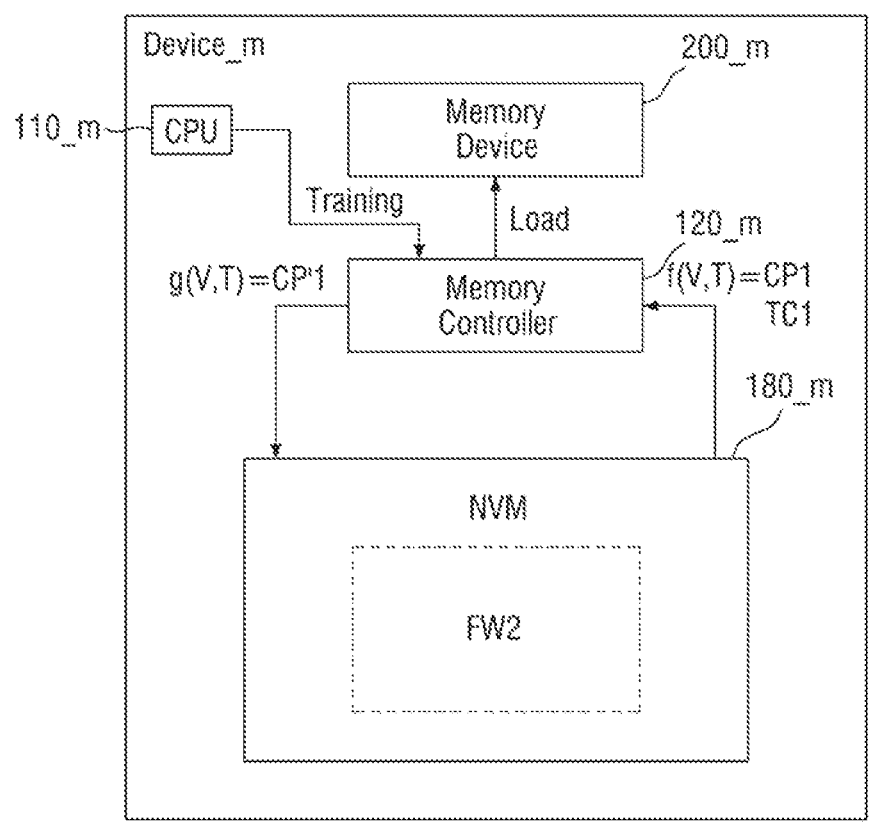

FIG. 4 is a flowchart explaining an example embodiment of a configuration parameter storing operation of FIG. 3. FIGS. 5 to 7 are diagrams explaining an example statistical prediction modeling according to the example embodiment of FIG. 4. FIGS. 8 and 9 are diagrams describing a training operation S250 of FIG. 4.

A configuration parameter CP1 is stored together with a voltage and a temperature in a nonvolatile memory 180 of each electronic device (operation S210).

The voltage, the temperature, and the configuration parameter corresponding to the voltage and the temperature stored in the nonvolatile memory 180 are transmitted to a server (operation S220).

Referring to FIGS. 3 and 5, in operation S100, an electronic system including a plurality of M electronic devices (Device_1~Device_M) is provided in operation S100. The first electronic device Device_1 includes a first memory device 200_1, a first memory controller 120_1, and a first nonvolatile memory 180_1. The first nonvolatile memory 180_1 stores a first firmware FW1. The first firmware FW1 may store a first operating voltage V_1, a first operating temperature T_1, and a first configuration parameter CP1(1,1) corresponding to the first operating voltage V_1 and the first operating temperature T_1 of the first memory device 200_1 into the first nonvolatile memory 180_1.

The first memory controller 120_1 may transmit the first operating voltage V_1, the first operating temperature T_1, and the first configuration parameter CP1(1,1) corresponding to the first operating voltage V_1 and the first operating temperature T_1 of the first memory device 200_1 to the first nonvolatile memory 180_1. The first firmware FW1 may transmit to a server 500 the first operating voltage V_1, the first operating temperature T_1, and the first configuration parameter CP1(1,1) corresponding to the first operating voltage V_1 and the first operating temperature T_1.

The $M^{th}$ electronic device Device_M includes an $M^{th}$ memory device 200_M, an $M^{th}$ memory controller 120_M, and an $M^{th}$ nonvolatile memory 180_M. The $M^{th}$ nonvolatile memory 180_M stores the first firmware FW1. The first firmware FW1 may store an $M^{th}$ operating voltage V_M, an $M^{th}$ operating temperature T_M, and a first configuration parameter CP1(M,M) corresponding to the $M^{th}$ operating voltage V_M and the $M^{th}$ operating temperature T_M of the $M^{th}$ memory device 200_M into the $M^{th}$ nonvolatile memory 180_M.

The $M^{th}$ memory controller 120_M may transmit the $M^{th}$ operating voltage V_M, the $M^{th}$ operating temperature T_M, and the first configuration parameter CP1(M,M) corresponding to the $M^{th}$ operating voltage V_M and the $M^{th}$ operating temperature T_M of the $M^{th}$ memory device 200_M to the $M^{th}$ nonvolatile memory 180_M. The first firmware FW1 may transmit to the server 500 the $M^{th}$ operating voltage V_M, the $M^{th}$ operating temperature T_M, and the first configuration parameter CP1(M,M) corresponding to the $M^{th}$ operating voltage V_M and the $M^{th}$ operating temperature T_M.

The $m^{th}$ electronic device (Device_m) includes an $m^{th}$ memory device 200_m, an $m^{th}$ memory controller 120_m, and an $m^{th}$ nonvolatile memory 180_m. The $m^{th}$ nonvolatile memory 180_m stores the first firmware FW1. The first firmware FW1 may store an $m^{th}$ operating voltage V_m, an $m^{th}$ operating temperature T_m, and a first configuration parameter CP1(m,m) corresponding to the $m^{th}$ operating voltage V_m and the $m^{th}$ operating temperature T_m of the $m^{th}$ memory device 200_m into the $m^{th}$ nonvolatile memory 180_m.

The $m^{th}$ memory controller 120_m may transmit the $m^{th}$ operating voltage V_m, the $m^{th}$ operating temperature T_m, and the first configuration parameter CP1(m,m) corresponding to the $m^{th}$ operating voltage V_m and the $m^{th}$ operating temperature T_m of the $m^{th}$ memory device 200_m to the $m^{th}$ nonvolatile memory 180_m. The first firmware FW1 may transmit to the server 500 the $m^{th}$ operating voltage V_m, the $m^{th}$ operating temperature T_m, and the first configuration parameter CP1(m,m) corresponding to the $m^{th}$ operating voltage V_m and the $m^{th}$ operating temperature T_m.

The first operating voltage V_1, the $m^{th}$ operating voltage V_m, and the $M^{th}$ operating voltage V_M may be the same as or different from one another. The first operating temperature T_1, the $m^{th}$ operating temperature T_m, and the $M^{th}$ operating temperature T_M may be the same as or different from one another. The description for the first configuration parameter CP1 herein is given for illustrative purposes only as an example of the configuration parameter (CP) of the disclosure, and the configuration parameter (CP) of the disclosure is not limited to the first configuration parameter CP1.

The firmware FW1 stored in the nonvolatile memory 180 may store an operating voltage, an operating temperature, and a configuration parameter into the nonvolatile memory 180, and may transmit the stored data to the server 500. As mentioned above, the transmission to the server may be performed through the nonvolatile memory interface 150 and the system interconnector 170, but the transmission scheme may vary depending on an embodiment.

The server performs statistical prediction modeling on the configuration parameter (CP) corresponding to the voltage and the temperature transmitted in operation S220 (operation S230). There may be a plurality of configuration parameters (CPs) for the memory device 200 according to an example embodiment. The server may individually perform the statistical prediction modeling for each configuration parameter (CP) using the voltage and the temperature as independent variables.

Referring to FIG. 6, the server 500 may store M groups of data (V, T, CP1) with respect to the first configuration parameter CP1. M data may exist in a V-T graph area with respect to the first configuration parameter CP1, and respective data may overlap in the V-T area.

For example, as shown in FIG. 6, (V_m, T_m) and (V_n, T_n) may be the same in the V-T area, but CP1(m,m) and CP1(n,n) may be different from each other as shown in FIG. 6, or CP1(m,m) and CP1(n,n) may be the same. The server 500 may perform the statistical prediction modeling on the M groups of data (V, T, CP1).

The statistical prediction modeling techniques may include Akaike Information Criterion (AIC), AIC correction (AICc), Bayesian Information Criterion, Maximum Likelihood Estimation (MLE), and Bayesian methods. However, the statistical prediction modeling according to an example embodiment is not limited to the above-mentioned modeling methods. The above methods may select the most suitable model among candidate models by using likelihood function values of the candidate models from given data, and a different model from the above-proposed models may be selected in consideration of the number of data and/or the number of parameters depending on an embodiment.

After performing the statistical prediction modeling on the M groups of data (V, T, CP1) related to the first configuration parameter CP1, the server 500 may provide a statistical prediction model f(V,T)=CP1 related to the voltage-temperature (V-T) and the first configuration parameter CP1.

The statistical prediction model f(V,T)=CP1 is stored in the nonvolatile memory 180 of each electronic device (operation S240). The training method according to some example embodiments may include storing the statistical prediction model in the nonvolatile memory 180 through the first firmware FW1.

Further referring to FIG. 7, in the above operation S240, the statistical prediction models f(V,T)=CP1 related to the first configuration parameters CP1 stored in the first to the $M^{th}$ nonvolatile memories (180_1~180_M) of the first to $M^{th}$ electronic devices (Device_1~Device M) may be identical in the electronic system according to some example embodiments.

According to some example embodiments, the statistical prediction model f(V,T)=CP1 related to the first configuration parameter CP1 may be stored in the nonvolatile memory 180 through the first firmware FW1.

Training on the statistical prediction model stored according to characteristics of each memory device 200 is performed (operation S250). In the training method according to some example embodiments, a second firmware FW2 (or adjustment firmware) may perform training for adjusting the stored statistical prediction model.

Referring to FIGS. 8 and 9, the memory controller 120 loads onto the memory device 200 the statistical prediction model f(V,T)=CP1 and a first training code TC1 stored in the nonvolatile memory 180 (operation S251).

Referring to FIG. 9, the statistical prediction model f(V,T)=CP1 modeled in FIG. 6 and the first training code TC1 for the first configuration parameter CP1 may be stored in the $m^{th}$ nonvolatile memory 180_$m$ included in the $m^{th}$ electronic device Device_m. The second firmware FW2 may transmit the statistical prediction model and the first training code TC1 to the $m^{th}$ memory controller 120_$m$, and the $m^{th}$ memory controller 120_$m$ may upload the same to the $m^{th}$ memory device 200_$m$.

The CPU 110 performs training on the loaded statistical prediction model f(V,T)=CP1 (operation S252). The $m^{th}$ CPU 110_$m$ allows the $m^{th}$ memory device 200_$m$ to perform, through the $m^{th}$ memory controller 120_$m$, training on the loaded statistical prediction model f(V,T)=CP1 using the first training code TC1. The training in operation S252 may reflect operational characteristics of the $m^{th}$ memory device 200_$m$ of the $m^t$ electronic device Device_m. Therefore, adjustment statistical prediction models that are obtained by adjusting the stored statistical precision models in association with the first configuration parameters CP1 of different electronic devices may be different from each other.

The statistical prediction model, the configuration parameter to be trained, and the training code include the statistical prediction model f(V,T)=CP1 related to the first configuration parameter CP1, the corresponding first configuration parameter CP1, and the training code TC1, but is not limited thereto.

In a training method according to some example embodiments, operation S252 may be performed by a software training (S/W Training). The S/W training corresponds to a fine training for more finely adjusting a parameter determined by a hardware training (H/W training). The S/W training is a procedure for readjusting a parameter set by the H/W training to a value for providing optimum reliability of the data in time. However, if different training needs to be performed considering the purpose and efficiency of training, the training in operation S252 is not limited to the S/W training.

The second firmware FW2 stores in the nonvolatile memory 180 an adjustment statistical prediction model g(V,T)=CP'1 on which training has been performed (operation S253).

The second firmware FW2 according to some example embodiments may store in a designated location the adjustment statistical prediction model g(V,T)=CP'1 related to the first configuration parameter CP1 so that a product firmware (PFW) can use the adjustment statistical prediction model. The second firmware FW2 according to some example embodiments may be replaced with a PFW, and in an example embodiment, in operation S200 of FIG. 3, a plurality of first configuration parameters CP1 may be stored through the adjustment statistical prediction model g(V,T)=CP'1.

Figure 10:
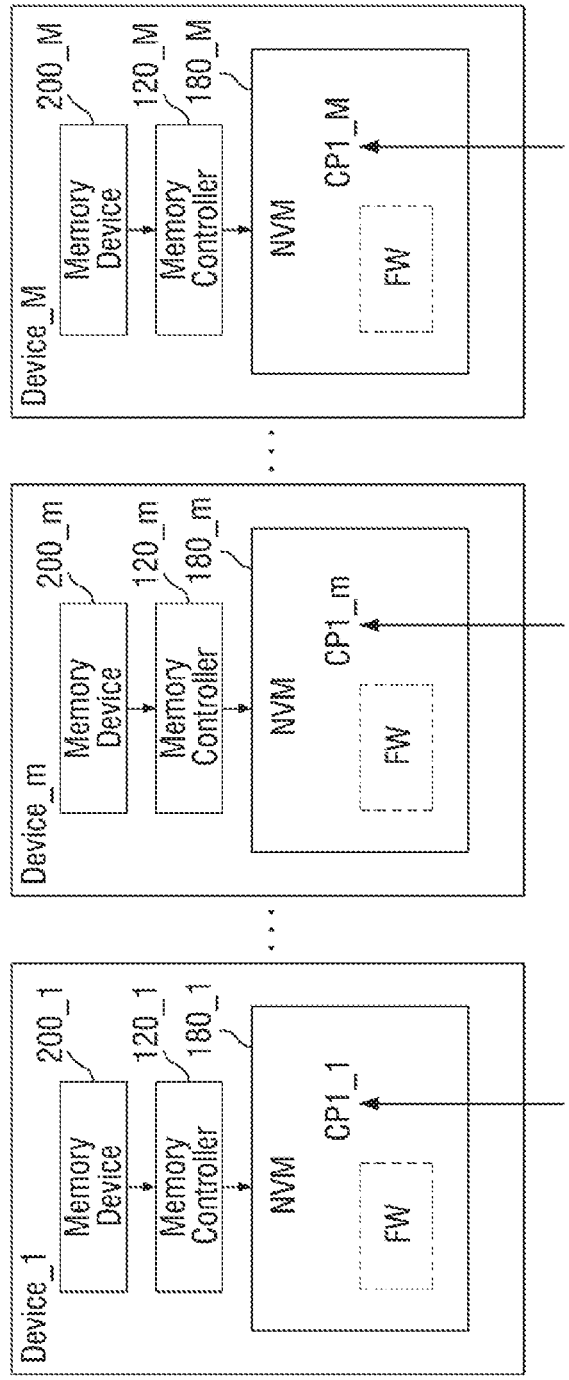

FIGS. 10 and 11 are diagrams describing another example embodiment of the configuration parameter storing operation of FIG. 3.

Referring to FIGS. 10 and 11, an electronic system including a plurality of electronic devices (Device_1~Device_M) is provided. A predetermined plurality of first_first configuration parameters CP1_1 associated with the first configuration parameter CP1 may be stored in the first nonvolatile memory 180_1 of the first electronic device Device_1 through a firmware (FW).

A plurality of predetermined first $M^{th}$ configuration parameters CP1_M associated with the first configuration parameter CP1 may be stored in the $M^{th}$ nonvolatile memory 180_M of the $M^{th}$ electronic device Device_M through the firmware (FW).

A plurality of predetermined first $m^{th}$ configuration parameters CP1_$m$ associated with the first configuration parameter CP1 may be stored in the $M^{th}$ nonvolatile memory 180_$m$ of the $m^{th}$ electronic device Device_m (1≤m≤M) through the firmware (FW).

The first_first configuration parameters CP1_1, the first $m^{th}$ configuration parameters CP1_$m$, and the first $M^{th}$ configuration parameters CP1_M are associated with the first configuration parameter CP1 and their values may vary depending on an operating voltage and an operating temperature of the memory device 200.

According to an example embodiment, there may be a case where values of the first_first configuration parameters CP1_1, the first $m^{th}$ configuration parameters CP1_$m$, and the first $M^{th}$ configuration parameters CP1_M in the electronic system are the same corresponding to the same operating voltage and the same operating temperature, and there may be case where values of the first_first configuration parameters CP1_1, the first $m^{th}$ configuration parameters CP1_$m$, and the first $M^{th}$ configuration parameters CP1_M in the electronic system are different corresponding to the same operating voltage and operating temperature are identical.

As mentioned above, the configuration parameter (CP) for the memory device 200 may include other configuration parameters (CP) than the first configuration parameter CP1, and may include an $n^{th}$ configuration parameter CPn and an $m^{th}$ configuration parameter CPm.

According to some example embodiments, a plurality of predetermined n_$m^{th}$ configuration parameters CPn_m and a plurality of predetermined m_$m^{th}$ configuration parameters CPm_m may be stored in the $M^{th}$ nonvolatile memory 180_$m$ of the $m^{th}$ electronic device Device_m in the electronic system.

According to an example embodiment, the parameter values may vary depending on the operating voltage (V_a, . . . , V_m, . . . , V_x) and the operating temperature (T_a, . . . , T_n, T_y) of the $m^{th}$ memory device 200_$m$. The predetermined n_$m^{th}$ configuration parameters CPn_m and the predetermined m_$m^{th}$ configuration parameters CPm_m may be stored in the $m^{th}$ nonvolatile memory 180_$m$ in the form of a table.

The description of the $m^{th}$ electronic device Device_m is given for illustrative purposes only as an example, and the disclosure is not limited to the $m^{th}$ electronic device Device_m.

Figure 12:
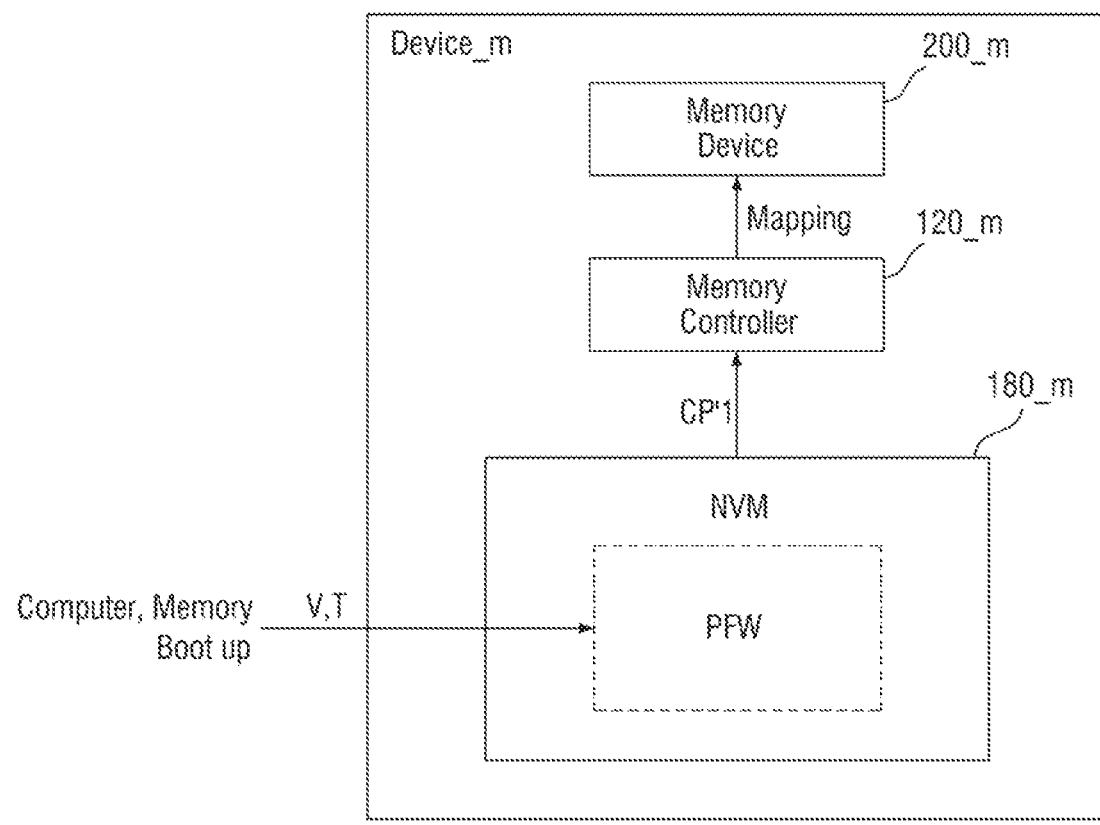
FIG. 12 is a diagram describing an example embodiment of a mapping operation of FIG. 3.

FIG. 12 is a diagram describing an example embodiment in the mapping operation of FIG. 3.

Referring to FIG. 12, when the $m^{th}$ electronic device Device_m is booted up, the operating voltage V and the operating temperature T of the $m^{th}$ memory device 200_$m$ are transmitted to the PFW. The first configuration parameter CP1 corresponding to the operating voltage V and the operating temperature T may be transmitted to the $m^{th}$ memory controller 120_$m$.

The $m^{th}$ memory controller 120_$m$ may map the received first configuration parameter CP1 to the $m^{th}$ memory device 200_$m$. Without performing a training operation using the first training code TC1, the mapping operation may perform adjustment of the configuration parameter in the same manner as the training.

Figure 13:
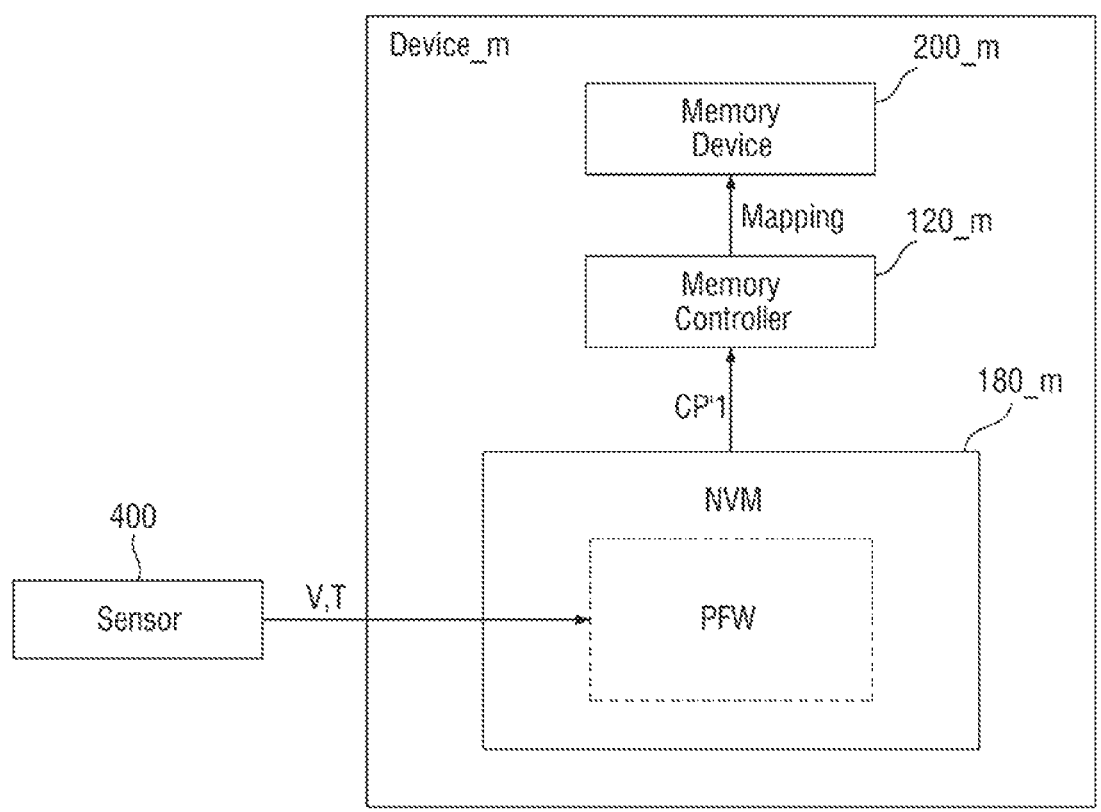
FIG. 13 is a diagram describing an example embodiment of the mapping operation of FIG. 3.

FIG. 13 is a diagram describing an example embodiment in the mapping operation of FIG. 3.

Referring to FIG. 13, a sensor 400 may periodically sense an operating voltage V and an operating temperature T of the $m^{th}$ memory device 200_$m$ while the $m^{th}$ electronic device Device_m is driven. During sensing, if there is a change in the operating voltage V and operating temperature T of the $m^{th}$ memory device 200_$m$, the sensor 400 may transmit the changed operating voltage V and/or the changed operating temperature T to the PFW. The operation after transmission is the same as in FIG. 12.

Figure 14:
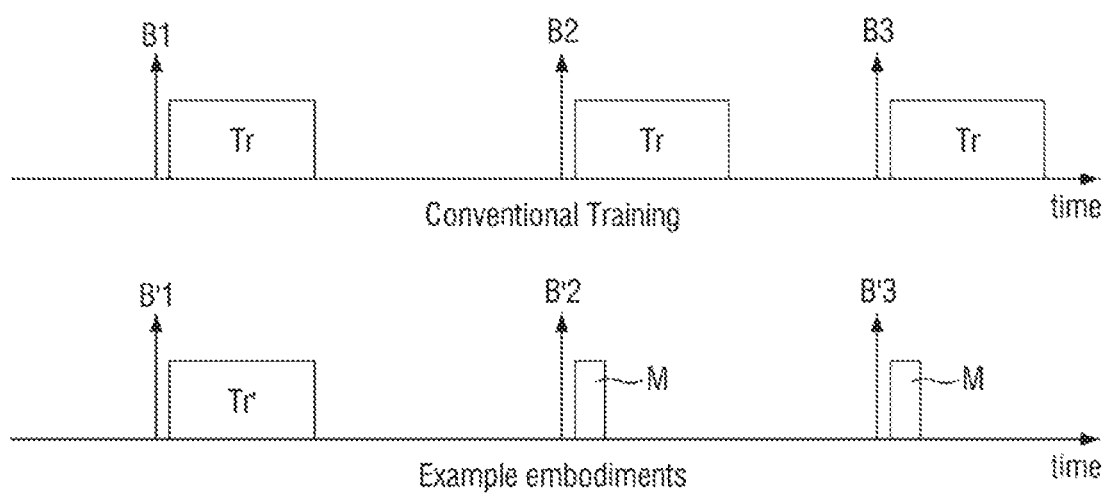
FIG. 14 is a timing diagram describing an effect according to an example embodiment of FIG. 12.

FIG. 14 is a timing diagram describing an effect according to the example embodiment of FIG. 12.

Referring to FIGS. 3 and 14, boot-ups B1, B2, and B3 of an electronic device may exist in a general conventional training. After the plurality of boot-ups B1, B2, and B3, a training Tr is performed. It is assumed that the electronic device is powered off in a period from when the training Tr is performed to the next boot-up. The training Tr may include adjusting a configuration parameter using a training code. Therefore, the time required for adjusting the configuration parameter in the training Tr after the first boot-up B1, the second boot-up B2, and the third boot-up B3 may be the same.

In a training method according to some example embodiments, there may be a plurality of boot-ups B'1, B'2, and B'3. A training Tr' may be performed after the first boot-up B'1. Subsequently, after the second boot up B'2, a mapping M may occur, and after the third boot-up B'3, the mapping M may occur.

After the first boot-up B'1, the training Tr' may include operations S200 to S400 of FIG. 3, and the mapping M after the second boot up B'2 or the third boot up B'3 may include operation S400 of FIG. 3 without including operation S200 of FIG. 3. After performing operation S200 of FIG. 3, the training method according to some example embodiments may adjust the training parameter only by the mapping M in consideration of the voltage and/or temperature change without performing a separate training operation using the trade code TC. Therefore, after the second boot-up B'2, the time required for adjusting the training parameter may be shortened.

In FIG. 14, operation S200 of FIG. 3 is performed after the first boot-up B'1 of the embodiment. However, in the electronic device according to some example embodiments, a plurality of configuration parameters (CP) may be stored in the nonvolatile memory 180 without a separate boot-up.

FIG. 15 is a timing diagram describing an effect according to the example embodiment of FIG. 13.

Referring to FIGS. 3 and 15, a plurality of boot-ups B1 and B2 of an electronic device may exist in a general conventional training. After a second boot-up B2, a first voltage temperature change C1 and a second voltage temperature change C2 may occur. After the first voltage temperature change C1 and the second voltage temperature change C2, a first voltage temperature sensing 51 and a second voltage temperature sensing S2 for the memory device may be performed, respectively. The voltage temperature sensing 51 and S2 may be performed periodically, and the period may not be limited.

After each of the plurality of boot-ups B1 and B2 and each of the voltage temperature sensings 51 and S2, the training Tr is performed. The training Tr may include adjusting the configuration parameters using the training code. Therefore, in the training Tr after each of the first boot-up B1, the second boot-up B2, the first voltage temperature sensing 51, and the second voltage temperature sensing S2, the time required for adjusting the configuration parameter may be identical.

In the training method according to some example embodiments, there may be a plurality of boot-ups B'1 and B'2 of the electronic device. After the second boot-up B'2, a first voltage temperature change C'1 and a second voltage temperature change C'2 may occur. After the first voltage temperature change C'1 and the second voltage temperature change C'2, a first voltage temperature sensing S'1 and a second voltage temperature sensing S'2 for the memory device may be performed, respectively. The voltage temperature sensing S'1 and S'2 may be performed periodically and the period may not be limited.

As in FIG. 14, after the first boot-up B'1 of the embodiment, the training Tr' may include operations S200 to S400 of FIG. 3, and the mapping M may include operation S400 of FIG. 3 without including operation S200 of FIG. 3. After performing operation S200 of FIG. 3, the training method according to some example embodiments may adjust the training parameter only by the mapping M in consideration of the voltage and/or temperature change without performing a separate training operation using the trade code TC. Therefore, after the second boot-up B'2, the time required for adjusting the training parameter may be shortened.

In FIG. 15, operation S200 of FIG. 3 is performed after the first boot-up B'1. However, in the electronic device according to some example embodiments, a plurality of configuration parameters (CPs) may be stored in the nonvolatile memory 180 without a separate boot-up.

The electronic device according to some example embodiments may reduce booting time by pre-storing a configuration parameter having different values depending on the device, an operating voltage, and/or an operating temperature of a memory device included in the electronic device. Further, by periodically adjusting the configuration parameter, the electronic device may decrease the training time, thereby reducing the open time of the memory device.

The effects of the disclosure are not limited to the above-described effects and other effects which are not described herein will become apparent to those skilled in the art from the following description.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, communication between the components, elements or units may be performed through a bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An electronic device comprising:
   a memory device;
   a nonvolatile memory configured to store a plurality of first configuration parameters respectively corresponding to operating voltages of the memory device and a plurality of second configuration parameters respectively corresponding to operating temperatures of the memory device; and
   a memory controller configured to:
   determine a value of a third configuration parameter corresponding to an operating voltage of the memory device among the plurality of first configuration parameters stored in the nonvolatile memory without performing a training operation;
   determine a value of a fourth configuration parameter corresponding to an operating temperature of the memory device among the plurality of second configuration parameters stored in the nonvolatile memory without performing the training operation; and
   drive the memory device according to the determined values of the third and the fourth configuration parameters.

2. The electronic device of claim 1, wherein the nonvolatile memory is further configured to store a first statistical prediction model corresponding to a first configuration parameter and modeled based on a voltage, and a second statistical prediction model corresponding to a second configuration parameter and modeled based on a temperature,
   wherein the nonvolatile memory is further configured to store an adjustment firmware which is configured to:
   adjust the first statistical prediction model to a first adjusted statistical prediction model based on a voltage characteristic of the memory device; and
   adjust the second statistical prediction model to a second adjusted statistical prediction model based on a temperature characteristic of the memory device, and
   wherein the third and the fourth configuration parameters are loaded onto the memory controller in the first and the second adjusted statistical prediction models.

3. The electronic device of claim 2, wherein the adjustment firmware is further configured to perform a fine training on the first statistical prediction model to reflect the voltage characteristic of the memory device, and a fine training on the second statistical prediction model to reflect the temperature characteristic of the memory device.

4. The electronic device of claim 2, wherein the memory controller is further configured to map the loaded third and fourth configuration parameters to the memory device.

5. The electronic device of claim 1, wherein the nonvolatile memory is further configured to store a first table with respect to a first configuration parameter, in which a value of the first configuration parameter varies based on the operating voltage, and a second table with respect to a second configuration parameter, in which a value of the second configuration parameter varies based on the operating temperature.

6. The electronic device of claim 5, wherein the nonvolatile memory further includes a product firmware configured to load the third and the fourth configuration parameters according to the operating voltage and the operating temperature.

7. The electronic device of claim 1, wherein the nonvolatile memory further includes a product firmware configured to load the third and the fourth configuration parameters corresponding to the operating voltage and the operating temperature.

8. The electronic device of claim 7, wherein the memory controller is further configured to map the loaded third and fourth configuration parameters to the memory device after the memory device is powered on.

9. The electronic device of claim 7, wherein the product firmware is further configured to, based on at least one of the operating voltage and the operating temperature being changed, load the third and the fourth configuration parameters corresponding to the changed at least one of the operating voltage and the operating temperature, and wherein the memory controller is further configured to map the loaded third and fourth configuration parameters to the memory device.

10. The electronic device of claim 1, wherein the memory device is configured to retain data stored in the memory device after the memory device is powered off.

11. The electronic device of claim 1, wherein the memory device is configured to delete data stored in the memory device after the memory device is powered off.

12. A method of training a memory device, the method comprising:

storing, in a storage unit, a plurality of first configuration parameters corresponding to operating voltages and operating temperatures of the memory device;

after storing the plurality of first configuration parameters, performing a boot-up of the memory device;

measuring an operating voltage and an operating temperature of the memory device that is booted up;

loading a second configuration parameter corresponding to the operating voltage and the operating temperature, among the plurality of first configuration parameters, into a memory controller; and mapping the loaded second configuration parameter to the memory device without performing a training operation.

13. The method of claim 12, wherein the storing the plurality of first configuration parameters comprises:

storing, in the storage unit, a statistical prediction model modeled based on a voltage and a temperature with respect to a first configuration parameter;

performing a training of adjusting the stored statistical prediction model to an adjusted statistical prediction model based on an operational characteristic of the memory device; and storing the adjusted statistical prediction model in the storage unit.

14. The method of claim 13, wherein the performing the training comprises performing a fine training on the statistical prediction model by reflecting the operational characteristic of the memory device.

15. The method of claim 13, wherein the storing the adjusted statistical prediction model comprises storing the adjusted statistical prediction model in a predetermined location in the storage unit to allow a product firmware to load the second configuration parameter.

16. The method of claim 12, wherein the storing the plurality of first configuration parameters comprises storing the plurality of first configuration parameters predetermined according to the operating voltages and the operating temperatures in the storage unit.

17. The method of claim 12, further comprising: after the mapping, remeasuring the operating voltage and the operating temperature of the memory device; and based on at least one of the operating voltage and the operating temperature being changed, remapping the second configuration parameter corresponding to the changed at least one of the operating voltage and the operating temperature to the memory device.

18. The method of claim 17, wherein the remapping comprises performing the remapping without performing the training operation.

19. An electronic system comprising:

a first electronic device including a first memory device included in a memory device, a first nonvolatile memory configured to store a plurality of first configuration parameters corresponding to operating voltages and operating temperatures of the first memory device, and a first memory controller configured to control the first memory device; and a second electronic device including a second memory device included in the memory device, a second nonvolatile memory configured to store a plurality of second configuration parameters corresponding to voltages and temperatures of the second memory device, and a second memory controller configured to control the second memory device, the second electronic device being separate from the first electronic device, wherein the first memory controller is further configured to map a third configuration parameter, corresponding to an operating voltage and an operating temperature of the first memory device among the plurality of first configuration parameters, to the first memory device without performing a training operation, and wherein the second memory controller is further configured to map a fourth configuration parameter, corresponding to an operating voltage and an operating temperature of the second memory device among the plurality of second configuration parameters, to the second memory device without performing the training operation.

20. The electronic system of claim 19, wherein the first nonvolatile memory comprises a first firmware configured to adjust, based on an operational characteristic of the first memory device, a statistical prediction model, modeled based on a voltage and a temperature with respect to a first configuration parameter, to a first statistical prediction model, the first firmware further configured to store the first statistical prediction model in the first nonvolatile memory, and wherein the second nonvolatile memory comprises a second firmware configured to adjust a statistical prediction model, based on an operational characteristic of the second memory device, modeled based on a voltage and a temperature with respect to a second configuration parameter, to a second statistical prediction model, the second firmware further configured to store the second statistical prediction model in the second nonvolatile memory.

* * * * *